United States Patent
Hong et al.

(10) Patent No.: US 12,402,617 B2
(45) Date of Patent: Sep. 2, 2025

(54) PEST TRAP FOR TEA PLANTING

(71) Applicant: ZUNYI NORMAL UNIVERSITY, Zunyi (CN)

(72) Inventors: Dunhua Hong, Zunyi (CN); Jiazhen Wang, Zunyi (CN); Dachen Song, Zunyi (CN); Ya Zou, Zunyi (CN); Zhenxing Fang, Zunyi (CN); Furu Zhong, Zunyi (CN); Xing Jin, Zunyi (CN); Hongying Chen, Zunyi (CN); Yi Luo, Zunyi (CN); Zhixi Gao, Zunyi (CN); Die Zhao, Zunyi (CN)

(73) Assignee: ZUNYI NORMAL UNIVERSITY, Zunyi (CN)

( * ) Notice: Subject to any disclaimer, the term of this patent is extended or adjusted under 35 U.S.C. 154(b) by 178 days.

(21) Appl. No.: 18/343,460

(22) Filed: Jun. 28, 2023

(65) Prior Publication Data

US 2024/0381864 A1  Nov. 21, 2024

(30) Foreign Application Priority Data

May 17, 2023  (CN) .......................... 202310560217.7

(51) Int. Cl.
*A01M 1/04* (2006.01)
*A01M 1/02* (2006.01)
*A01M 1/10* (2006.01)

(52) U.S. Cl.
CPC .............. *A01M 1/04* (2013.01); *A01M 1/023* (2013.01); *A01M 1/10* (2013.01); *A01M 1/106* (2013.01); *A01M 2200/01* (2013.01)

(58) Field of Classification Search
CPC .......... A01M 1/00; A01M 1/02; A01M 1/023; A01M 1/026; A01M 1/04; A01M 1/10; A01M 1/106; A01M 1/14; A01M 1/145
USPC .................................. 43/107, 113, 114, 122
See application file for complete search history.

(56) References Cited

U.S. PATENT DOCUMENTS 4,168,591 A * 9/1979 Shaw ...................... A01M 1/14
                                                          43/118
4,443,964 A * 4/1984 Horn ....................... A01M 1/02
                                                          43/118
4,654,998 A * 4/1987 Clay ...................... A01M 1/145
                                                          43/115

(Continued)

FOREIGN PATENT DOCUMENTS

CN       201294816 Y  *  8/2009
CN       204317327 U  *  5/2015

(Continued)

*Primary Examiner* — Darren W Ark
(74) *Attorney, Agent, or Firm* — Justin Lampel

(57) ABSTRACT

The present disclosure relates to the technical field of pest capturing in protection of tea trees, in particular to a pest trap for tea planting. The pest trap includes a trap framework and a light-emitting diode (LED) lamp; an upper end of the trap framework is provided with a support which is used for clamping the LED lamp; a board for trapping pests coated with sex pheromone on a surface is arranged inside the trap framework; a heating source is arranged on one side of the board for trapping pests and is used for making the sex pheromone to be volatilized faster and farther; a mesh enclosure used for trapping pests is arranged on an outer side of the trap framework; and a small circular hole is formed in a bottom of the mesh enclosure.

5 Claims, 3 Drawing Sheets

(56) References Cited

U.S. PATENT DOCUMENTS

| | | | | |
|---|---|---|---|---|
| 5,095,648 | A * | 3/1992 | Keenan | A01M 1/02 43/136 |
| 5,184,417 | A * | 2/1993 | Weldon | A01M 1/106 43/107 |
| 5,203,816 | A * | 4/1993 | Townsend | A01M 1/145 43/113 |
| 5,231,790 | A * | 8/1993 | Dryden | A01M 1/145 43/113 |
| 5,513,465 | A * | 5/1996 | Demarest | A01M 1/145 43/113 |
| 5,595,018 | A * | 1/1997 | Wilbanks | A01M 1/223 43/112 |
| 5,799,436 | A * | 9/1998 | Nolen | A01M 1/223 43/112 |
| 5,907,923 | A * | 6/1999 | Heath | A01N 33/04 43/107 |
| 5,915,948 | A * | 6/1999 | Kunze | A01M 1/145 43/113 |
| 6,055,766 | A * | 5/2000 | Nolen | A01M 1/023 43/112 |
| 6,088,949 | A * | 7/2000 | Nicosia | A01M 1/023 43/132.1 |
| 6,199,315 | B1 * | 3/2001 | Suzue | A01M 1/14 43/113 |
| 6,425,202 | B1 * | 7/2002 | Lin | A01M 1/2016 43/132.1 |
| 6,516,559 | B1 * | 2/2003 | Simchoni | A01M 1/023 43/107 |
| 6,655,080 | B2 * | 12/2003 | Spiro | A01M 1/08 43/107 |
| 7,234,268 | B2 * | 6/2007 | Welch | A01M 1/02 43/112 |
| 8,109,036 | B1 * | 2/2012 | Wilbanks | A01M 1/223 43/112 |
| 10,736,309 | B1 * | 8/2020 | Cogley | H04M 1/72409 |
| 11,311,005 | B2 * | 4/2022 | Smith | A01M 1/023 |
| 2003/0061757 | A1 * | 4/2003 | Askin | A01M 1/023 43/112 |
| 2003/0070346 | A1 * | 4/2003 | Winner | F23D 14/28 43/112 |
| 2004/0128902 | A1 * | 7/2004 | Kollars, Jr. | A01M 1/22 43/107 |
| 2006/0016120 | A1 * | 1/2006 | Masters | A01M 1/14 43/107 |
| 2009/0313883 | A1 * | 12/2009 | Olson | A01M 1/026 424/84 |
| 2010/0024278 | A1 * | 2/2010 | Simchoni-Barak | A01M 1/145 43/107 |
| 2010/0024279 | A1 * | 2/2010 | Plato | A01M 1/2016 424/84 |
| 2010/0154290 | A1 * | 6/2010 | Fisher | A01M 1/10 43/107 |
| 2012/0124890 | A1 * | 5/2012 | Hainze | A01M 1/026 43/121 |
| 2013/0283671 | A1 * | 10/2013 | Czokajlo | A01M 1/026 43/113 |
| 2020/0352152 | A1 * | 11/2020 | Stevens | A01M 1/023 |

FOREIGN PATENT DOCUMENTS

| | | | | |
|---|---|---|---|---|
| CN | 205180143 U | * | 4/2016 | |
| CN | 105532609 A | * | 5/2016 | A01M 1/04 |
| CN | 205337306 U | * | 6/2016 | |
| CN | 205492200 U | * | 8/2016 | |
| CN | 206024952 U | * | 3/2017 | |
| CN | 208338723 U | * | 1/2019 | |
| CN | 208597581 U | * | 3/2019 | |
| CN | 209017713 U | * | 6/2019 | |
| CN | 110050772 A | * | 7/2019 | |
| CN | 209300043 U | * | 8/2019 | A01M 1/02 |
| CN | 209862041 U | * | 12/2019 | |
| CN | 210382349 U | * | 4/2020 | |
| CN | 210492281 U | * | 5/2020 | |
| CN | 112825828 A | * | 5/2021 | |
| CN | 213344047 U | * | 6/2021 | |
| CN | 213784949 U | * | 7/2021 | |
| CN | 213784950 U | * | 7/2021 | |
| CN | 113367105 A | * | 9/2021 | |
| CN | 214155928 U | * | 9/2021 | |
| CN | 214229552 U | * | 9/2021 | |
| CN | 214546695 U | * | 11/2021 | A01M 1/026 |
| CN | 214593780 U | * | 11/2021 | |
| CN | 113812384 A | * | 12/2021 | |
| CN | 214962140 U | * | 12/2021 | |
| CN | 215074920 U | * | 12/2021 | |
| CN | 215074926 U | * | 12/2021 | |
| CN | 215346624 U | * | 12/2021 | |
| CN | 215422388 U | * | 1/2022 | |
| CN | 215531043 U | * | 1/2022 | |
| CN | 215531055 U | * | 1/2022 | |
| CN | 215602749 U | * | 1/2022 | |
| CN | 215992461 U | * | 3/2022 | |
| CN | 216018637 U | * | 3/2022 | |
| CN | 216254856 U | * | 4/2022 | |
| CN | 216821401 U | * | 6/2022 | |
| CN | 216874644 U | * | 7/2022 | |
| CN | 216906537 U | * | 7/2022 | |
| CN | 216961252 U | * | 7/2022 | |
| CN | 217065105 U | * | 7/2022 | |
| CN | 217136541 U | * | 8/2022 | |
| CN | 217242289 U | * | 8/2022 | |
| CN | 217487366 U | * | 9/2022 | |
| GB | 2525897 B | * | 4/2018 | A01M 1/04 |
| KR | 100853616 B1 | * | 8/2008 | |
| KR | 101152776 B1 | * | 6/2012 | |
| KR | 20150004202 U | * | 11/2015 | |
| KR | 101857372 B1 | * | 5/2018 | |
| RU | 2105474 C1 | * | 2/1998 | |
| WO | WO-2006046067 A1 | * | 5/2006 | A01M 1/2005 |
| WO | WO-2020081031 A2 | * | 4/2020 | |
| WO | WO-2022189845 A1 | * | 9/2022 | |

* cited by examiner

PEST TRAP FOR TEA PLANTING

CROSS REFERENCE TO RELATED APPLICATION

This patent application claims the benefit and priority of Chinese Patent Application No. 2023105602177, filed with the China National Intellectual Property Administration on May 17, 2023, the disclosure of which is incorporated by reference herein in its entirety as part of the present application.

TECHNICAL FIELD

The present disclosure relates to the technical field of pest trapping in protection of tea trees, in particular to a pest trap for tea planting.

BACKGROUND ART

In the agricultural planting industry, especially in a process of tea planting, as production increases, the pests and diseases are becoming more and more serious, causing serious production loss to tea, resulting in a decline in the yield and quality of tea. Based on this, tea farmers often use pesticide to prevent and control pests. Due to application of a large amount of pesticide for a long time, the pesticide resistance of pests in a tea garden increases, so it is not easy to trap and kill pests. Furthermore, there may be pesticide residues that affect the quality and safety of tea, which is not conducive to people's health. Excessive pesticide will also cause a harmful effect to the ecological environment.

SUMMARY

The present disclosure aims to provide a pest trap for tea planting, which can achieve a better trapping effect on pests in a tea garden and is more convenient to use and pollution-free to the environment.

The present disclosure provides a pest trap for tea planting, including a trap framework and a light-emitting diode (LED) lamp; an upper end of the trap framework is provided with a support which is used for clamping the LED lamp; a board for trapping pests coated with sex pheromone on a surface is arranged inside the trap framework; a heating source is arranged on one side of the board for trapping pests and is used for volatizing the sex pheromonex faster and farther; a mesh enclosure used for trapping pests is arranged on an outer side of the trap framework; and a small circular hole is formed in a bottom of the mesh enclosure.

Further, the sex pheromone is female sex pheromone. Corresponding female sex pheromone is selected according to the species of a pest to be prevented and is coated on the board for trapping pests to achieve an effect of trapping male pests.

Further, a bottom of the trap framework is provided with supporting legs.

Further, the trap framework is cylindrical.

Further, the board for trapping pests is a hollow cylinder formed by splicing a blue rectangular board and a yellow rectangular board, and is placed at a center position inside the trap framework. Due to certain sensitivity to some colors, insects often tend to fly to objects in these colors. The insects have good color tropism to yellow color and blue color. According to the color tropism of insects, the yellow and blue board for trapping pests is used to trap pests into the trap, making the pests fail to fly, thus achieving the purpose of preventing and treating pests.

Further, a surface of the board for trapping pests is a smooth material since a non-viscous board for trapping pests can be cyclically and repeatedly used for a long time.

Further, the yellow has a wavelength of 575 nm±10 nm, and the blue has a wavelength of 465 nm±10 nm.

Further, the female sex pheromone is sprayed to an inner surface of the hollow cylinder, and the heating source is placed on the outer side of the hollow cylinder to enable the sex pheromone inside the board for trapping pests to achieve the best volatilization effect.

Further, the heating source is a semiconductor heating sheet which can achieve a heating effect on a space, is safe to use, and has the advantages of insulation, pressure resistance, flame resistance and the like. By means of heating the female sex pheromone on the board for trapping pests, the female sex pheromone can be volatilized faster and farther, thus trapping more pests.

Further, a top of the trap framework is provided with a rain cover which can protect the trap from being exposed to the sun and rain.

Beneficial Effects

According to the pest trap, the LED lamp emits light for stimulation. A living being has tropism to the stimulation of light, that is, insects have phototaxis and will fly to a light source. Due to the phototaxis, the insects are trapped into the trap, thus achieving an insect expelling effect. The sex pheromone is one kind of insect pheromone, which achieves communication between insect individuals of the same specifies for courting, foraging, perching and other activities. The insect pheromone is secreted and released by insects in the bodies. The released pheromone can allure heterosexual individuals and can cause the heterosexual individuals to arise reproductive reactions for foraging and directional mating. Synthetic female sex pheromone is released in a tea garden to trap male pests into the pest trap, so that the male pests and female pests are prevented from mating, thus reducing the number of pests and also reducing pests of the next generation.

BRIEF DESCRIPTION OF THE DRAWINGS

In order to describe the specific implementation modes of the present disclosure or the technical solutions in the prior art more clearly, drawings required to be used in the specific implementation modes or the illustration of the prior art will be briefly introduced below. Apparently, the drawings in the illustration below are some implementation modes of the present disclosure. Those ordinarily skilled in the art can also obtain other drawings according to these drawings without doing creative work.

Figure 1:
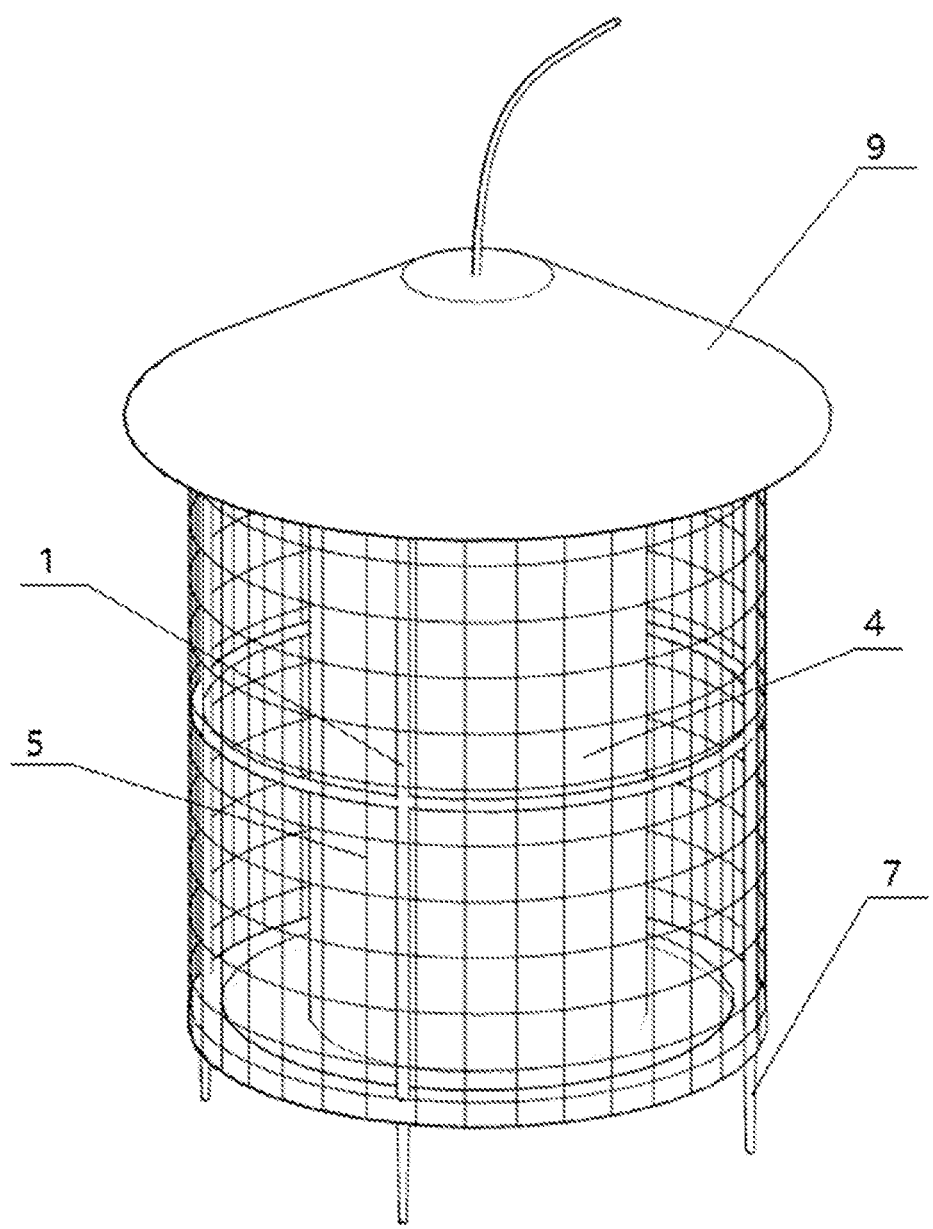
FIG. 1 is an overall schematic diagram of the present disclosure.

Reference signs in the drawings: 1: trap framework; 2: LED lamp; 3: support; 4: board for trapping pests; 5: mesh enclosure; 6: small circular hole; 7: supporting leg; 8: semiconductor heating sheet; 9: rain cover; and 10: bottom plate.

DETAILED DESCRIPTION OF THE EMBODIMENTS

Technical solutions of the present disclosure will be described clearly and completely below in combination with the embodiments. Obviously, the embodiments described herein are part of the embodiments of the present disclosure, not all the embodiments. Based on the embodiments in the present disclosure, all other embodiments obtained by those of ordinary skill in the art without creative work shall fall within the protection scope of the present disclosure.

In the description of the present disclosure, it should be understood that orientations or positional relationships indicated by the terms "center", "longitudinal", "transverse", "length" "width", "thickness", "upper", "lower", "front", "rear", "left", "right", "vertical", "horizontal", "top", "bottom", "inside", "outside", "clockwise", "anticlockwise", and the like are orientations or positional relationships as shown in the drawings, and are only for the purpose of facilitating and simplifying the description of the present disclosure instead of indicating or implying that devices or elements indicated must have particular orientations, and be constructed and operated in the particular orientations, so that these terms are not construed as limiting the present disclosure.

In addition, the terms "first" and "second" are used for descriptive purposes only and are not to be understood to indicate or imply relative importance or to imply the number of indicated technical features. Therefore, features defined by "first" and "second" can explicitly instruct or impliedly include one or more features. In the description of the present disclosure, unless expressly specified otherwise, the meaning of the "plurality" is two or more than two. In addition, the terms "mount", "connect" and "connection" shall be understood broadly. For example, it may be fixed connection, detachable connection, integral connection, mechanical connection, electrical connection, direct connection, indirect connection via an intermediate, or inter-connection between two elements. Those of ordinary skill in the art can understand the specific meanings of the above terms in the present disclosure according to specific situations.

Embodiment 1

Figure 2:
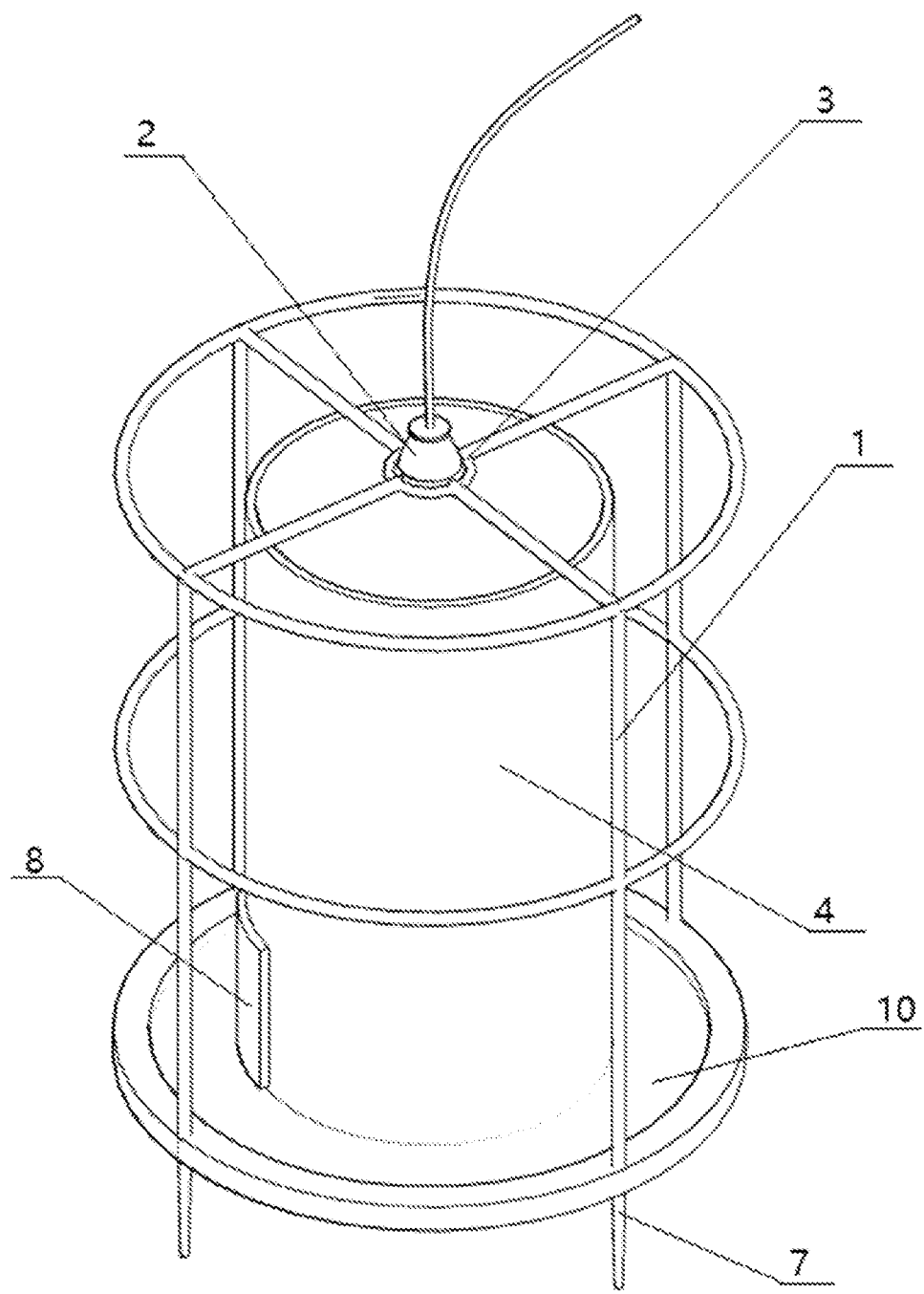
FIG. 2 is a schematic diagram of a trap framework and an inside of the trap framework of the present disclosure.
Figure 3:
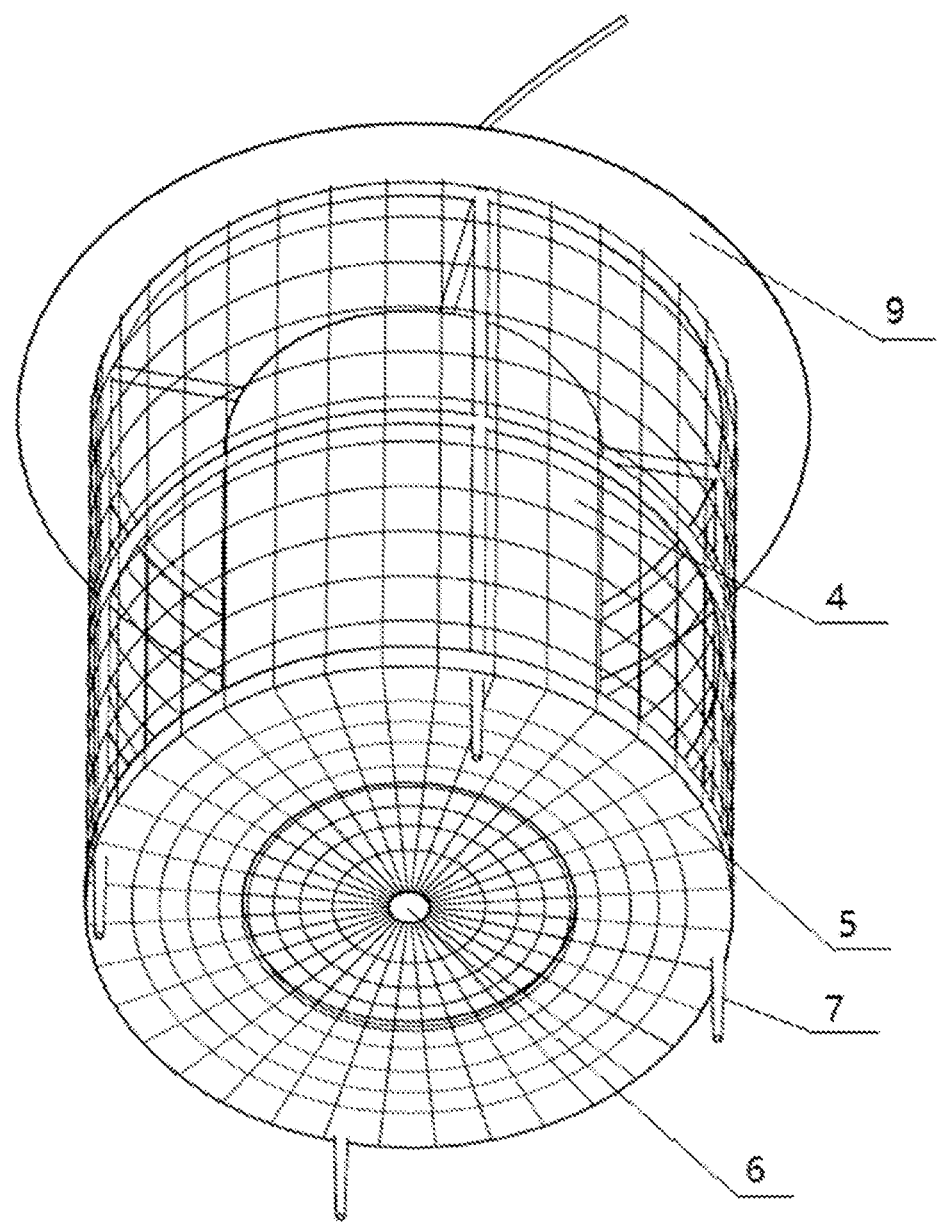
FIG. 3 is a schematic diagram of a bottom of the present disclosure.

A pest trap for tea planting, as shown in FIGS. 1-3, includes a cylindrical trap framework 1 and an LED lamp 2. A bottom of the trap framework 1 is provided with supporting legs 7; and an upper end of the trap framework 1 is provided with a support 3 which is used for clamping the LED lamp 2. A blue and yellow splice of hollow cylindrical trap board 4 surrounds the inner center of trap frame 1; a bottom of the trap framework 1 is provided with a bottom plate 10; a circular hole is formed in the middle of the bottom plate 10; a diameter of the circular hole is slightly less than that of the hollow cylindrical board 4 for trapping pests; the hollow cylindrical board 4 for trapping pests is erected above the circular hole, and an inner surface of the hollow cylindrical board 4 for trapping pests is coated with female sex pheromone (the sex pheromone on the board 4 for trapping pests is pest sex pheromone, aggregation pheromone or plant meta-pheromone for Empoascavitis, aleyrodid, thrips and the like in a tea garden); a semiconductor heating sheet 8 is attached to an outer side of the hollow cylindrical board 4 for trapping pests; and the semiconductor heating sheet 8 can achieve a heating effect on a space, is safe to use and has the advantages of insulation, pressure resistance, flame resistance and the like. By means of heating the female sex pheromone on the board 4 for trapping pests, the female sex pheromone can be volatilized faster and farther, thus trapping more pests. A mesh enclosure 5 used for trapping pests is arranged on the outer side of the trap framework 1. A small circular hole 6 is formed in a bottom of the mesh enclosure 5. The small circular hole 6 is a passage for allowing pests to get into the trap. The yellow of the board for trapping pests has a wavelength of 575 nm±10 nm, and the blue has a wavelength of 465 nm±10 nm; the yellow board has a wider pest trapping area, and the blue board is more targeted in pest killing. The two kinds of boards for trapping pests are combined for use to greatly enhance the pest trapping effect. There are many kinds of pests in the tea garden, and different pests have different tendency to colors. For example, Empoascavitis has tropism to yellow color, and thrips has tropism to blue color. In the pest prevention and treatment process, there is a trouble since insects have different color tropisms. It is more efficient to splice the yellow and blue boards for trapping pests into the hollow cylindrical board for trapping pests. A top of the trap framework 1 is also provided with a rain cover 9, which can protect the trap from being exposed to the sun and rain, so that the service life of the trap is prolonged.

Working Principle:

The present disclosure provides a trap applied to a tea garden to trap small pests such as Empoascavitis, tea geometrid, and thrips. The hollow cylindrical board for trapping pests formed by splicing the yellow and blue boards for trapping pests is encircled in the center of the trap; the semiconductor heating sheet is attached to the outer side of the hollow cylindrical board for trapping pests; the inner surface of the hollow cylindrical board for trapping pests is sprayed with the sex pheromone; after the heating sheet generates heat, the sex pheromone can be catalyzed to attract pests to the maximum extent; meanwhile, the colored hollow cylindrical board for trapping pests can also attract pests; and in addition, pests need to actively tend to a room-temperature place in the environment in order to survive, that is, the pests have thermotaxis. The LED lamp emits light and heat, and the semiconductor heating sheet generates heat, so that pests can be effectively trapped. By combining the four components, pests are trapped by fully using color, sex pheromone, light and temperature. The pests are induced to pass through the small circular hole and get into the trap, so that the pest trapping rate is greatly increased. A circle of fine transparent mesh enclosure is covered outside the trap, which can ensure that the pests that have entered the trap cannot fly out. A rainproof device is placed at the top end of the trap, which can protect the trap from being exposed to the sun and rain. When the trap is applied to a tea garden to trap pests, the trap is placed between two tea groups. After the prevention and treatment end, trapped pests can be used as fertilizer for the tea garden. The trap is recyclable.

It should be finally noted that the above various embodiments are only used to describe the technical solutions of the utility model, and not intended to limit the utility model. Although the utility model has been described in detail with reference to the foregoing embodiments, those ordinarily skilled in the art should understand that they can still modify the technical solutions described in all the foregoing embodiments, or equivalently replace some or all of the technical features, and these modifications or replacements do not depart the essences of the corresponding technical solutions from the spirit and scope of the technical solutions of all the embodiments of the utility model.

What is claimed is:

1. A pest trap for tea planting comprising:

a trap framework and a light-emitting diode lamp, wherein an upper end of the trap framework is provided with a support which is used for clamping the light-emitting diode lamp;

a board for trapping pests being coated with a female sex pheromone on a surface thereof and being arranged inside the trap framework, wherein the board for trapping pests is a hollow cylinder formed by splicing a blue rectangular board and a yellow rectangular board and is placed at a center position inside the trap framework, wherein the surface of the board for trapping pests is a smooth material, wherein the yellow has a wavelength of 575 nm±10 nm, and the blue has a wavelength of 465 nm±10 nm, and wherein the female sex pheromone is sprayed to an inner surface of the hollow cylinder;

a heating source is arranged on one side of the board for trapping pests and is used for making the female sex pheromone to be volatilized faster and farther, wherein the heating source is placed on an outer side of the hollow cylinder;

a mesh enclosure used for trapping pests is arranged on an outer side of the trap framework; and a small circular hole is formed in a bottom of the mesh enclosure.

2. The pest trap for tea planting according to claim 1, wherein a bottom of the trap framework is provided with supporting legs.

3. The pest trap for tea planting according to claim 1, wherein the trap framework is cylindrical.

4. The pest trap for tea planting according to claim 1, wherein the heating source is a semiconductor heating sheet.

5. The pest trap for tea planting according to claim 1, wherein a top of the trap framework is provided with a rain cover.

* * * * *